United States Patent
Büttner et al.

(10) Patent No.: US 11,916,695 B2
(45) Date of Patent: Feb. 27, 2024

(54) FIELD DEVICE FOR CHECKING THE QUALITY OF A NETWORK CONNECTION

(71) Applicant: Endress+Hauser Process Solutions AG, Reinach (CH)

(72) Inventors: Karl Büttner, Neuenburg (DE); Axel Eidmann, Lörrach (DE); Benedikt Spielmann, Basel (CH); Benjamin Schaupp, Rheinfelden (DE); Martin Lohmann, Gerlingen (DE); Oliver Zwick, Durach (DE); Harald Freimark, Lörrach (DE)

(73) Assignee: Endress+Hauser Process Solutions AG, Reinach (CH)

( * ) Notice: Subject to any disclaimer, the term of this patent is extended or adjusted under 35 U.S.C. 154(b) by 0 days.

(21) Appl. No.: 17/999,656

(22) PCT Filed: Apr. 23, 2021

(86) PCT No.: PCT/EP2021/060731
§ 371 (c)(1),
(2) Date: Nov. 22, 2022

(87) PCT Pub. No.: WO2021/239350
PCT Pub. Date: Dec. 2, 2021

(65) Prior Publication Data
US 2023/0208674 A1 Jun. 29, 2023

(30) Foreign Application Priority Data
May 29, 2020 (DE) ...................... 10 2020 114 491.1

(51) Int. Cl.
*H04L 12/40* (2006.01)
*H04L 43/12* (2022.01)

(52) U.S. Cl.
CPC .............. *H04L 12/40* (2013.01); *H04L 43/12* (2013.01); *H04L 2012/4026* (2013.01)

(58) Field of Classification Search
CPC . H04L 12/40; H04L 43/12; H04L 2012/4026; H04L 43/00
See application file for complete search history.

(56) References Cited

U.S. PATENT DOCUMENTS 9,009,542 B1    4/2015  Marr et al.
2018/0091392 A1 3/2018  Richards et al.
(Continued)

FOREIGN PATENT DOCUMENTS

CN    101146011 A    3/2008
CN    110573975 A    12/2019
(Continued)

*Primary Examiner* — Shirley X Zhang
(74) *Attorney, Agent, or Firm* — Mark A. Logan; Endress+Hauser (USA) Holding, Inc.

(57) ABSTRACT

A field device of automation technology having a function for checking quality of a network connection includes an operating electronics and at least one communication interface for connecting to a communication network having one or more network participants and for building a communication connection, wherein a communication stack and a PHY are associated with the communication interface, wherein the communication stack and the PHY are embodied continually to gain and to store communication information regarding the communication connection, wherein the operating electronics is embodied to read out communication information from the communication stack and from the PHY, and by means of an algorithm to subject the communication information to computation and based on the result of the computation to classify a communication state.

7 Claims, 1 Drawing Sheet

(56) References Cited

U.S. PATENT DOCUMENTS

2018/0139104 A1* 5/2018 Seddigh .................. H04L 41/12
2020/0145304 A1  5/2020 Wulff et al.
2020/0389520 A1* 12/2020 Mayer ................. H04L 67/1008
2021/0081346 A1* 3/2021 Nixon ..................... H04L 69/08

FOREIGN PATENT DOCUMENTS

| CN | 110941230 A | 3/2020 |
| DE | 102016107104 A1 | 10/2017 |
| DE | 102018008674 A1 | 5/2020 |
| EP | 3648416 A1 | 5/2020 |
| EP | 2979144 B1 | 6/2020 |

* cited by examiner

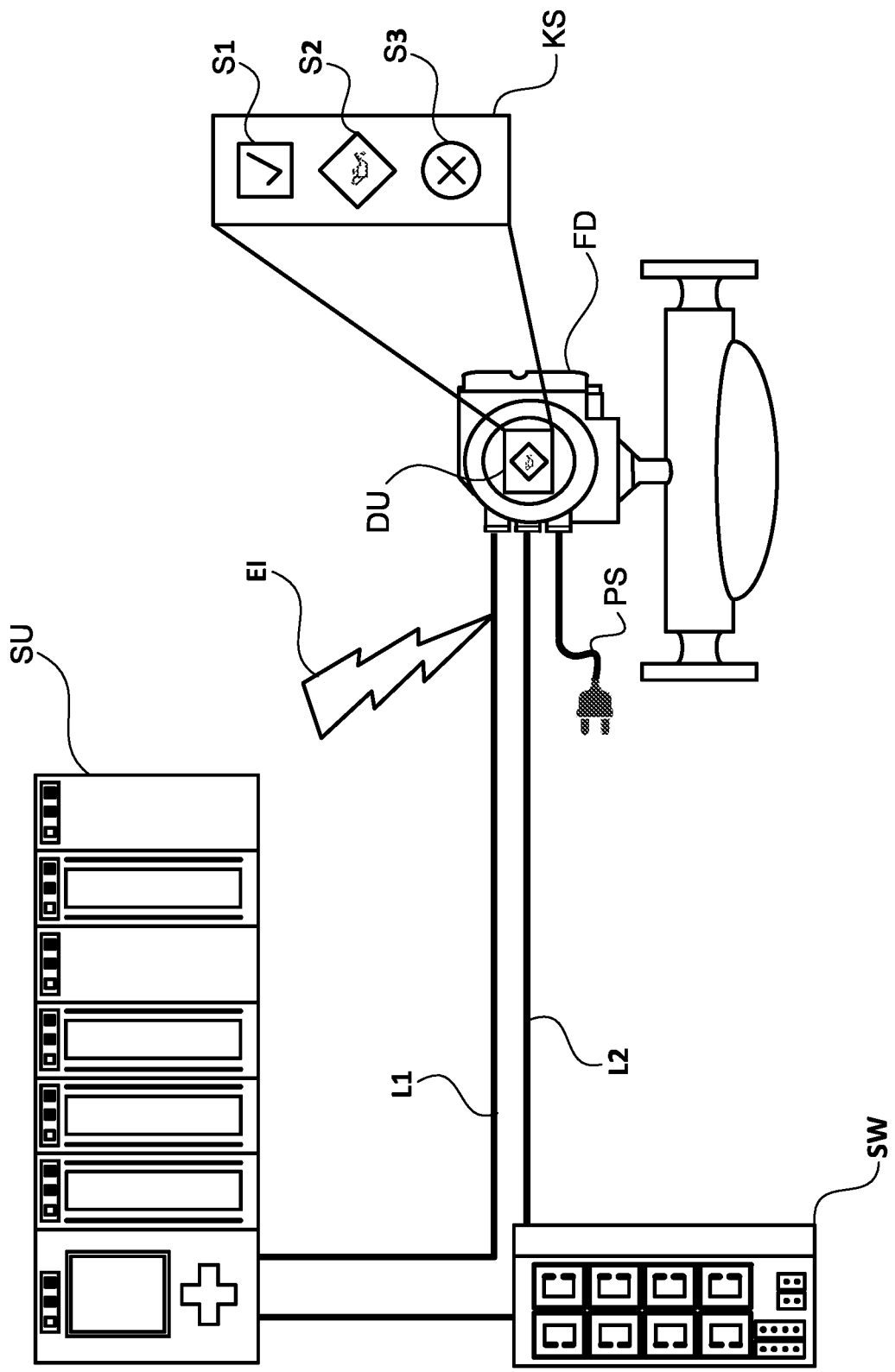

FIELD DEVICE FOR CHECKING THE QUALITY OF A NETWORK CONNECTION

CROSS-REFERENCE TO RELATED APPLICATIONS

The present application is related to and claims the priority benefit of DPMA Patent Application No. 10 2020 114 491.1, filed on May 29, 2020, and International Patent Application No. PCT/EP2021/060731, filed Apr. 23, 2021, the entire contents of which are incorporated herein by reference.

TECHNICAL FIELD

The invention relates to a field device of automation technology having a function for checking the quality of a network connection.

BACKGROUND

Known from the state of the art are field devices, which are used in industrial plants. Field devices are often applied in process automation technology, as well as in manufacturing automation technology. Referred to as field devices are, in principle, all devices, which are applied near to a process and which deliver, or process, process relevant information. Field devices are used for registering and/or influencing process variables. Serving for registering process variables are measuring devices, or sensors. Such are used, for example, for pressure- and temperature measurement, conductivity measurement, flow measurement, pH measurement, fill level measurement, etc. and register the corresponding process variables, pressure, temperature, conductivity, pH value, fill level, flow, etc. Used for influencing process variables are actuators. Such are, for example, pumps or valves, which can influence the flow of a liquid in a measuring tube or pipe or the fill level in a container. Besides the above mentioned measuring devices and actuators, referred to as field devices are also remote I/Os, radio adapters, and, in general, devices, which are arranged at the field level.

A large number of such field devices are produced and sold by the Endress+Hauser group of companies.

In modern industrial plants, field devices are, as a rule, connected with superordinated units via communication networks, such as, for example, fieldbusses (Profibus®, Foundation® Fieldbus, HART®, etc.). Normally, the superordinated units are control systems, or control units, such as, for example, a PLC (programmable logic controller). The superordinated units serve, among other things, for process control, process visualizing, process monitoring as well as for commissioning of field devices. The measured values registered by field devices, especially by their sensors, are transmitted via the bus system to one or more superordinated units. In addition, also a data transmission from the superordinated unit via the bus system to the field devices is required, especially for configuring and parametering of field devices as well as for operation of actuators.

For servicing field devices (for example, for parametering field devices or for retrieving data from them), frequently mobile service devices are used. Such are connected with a field device by wire (for example, via a service interface) or wirelessly (for example, via Bluetooth). The service devices are, for example, laptops, mobile end devices, such as smartphone or tablets, or central asset management stations.

For measuring individual parameters, the market provides diverse solutions, which permit inference of the connection quality of network participants or the status of a network.

Forming a first example are network components of the firm, Cisco, for determining a so-called "Network Health Score". This is a percentage of correctly functioning ("healthy") devices in the network relative to the total number of devices in the network. For each device, a health index is calculated. If this lies between 8 and 10, the device is categorized as correctly functioning. This "Network Health Score" is recalculated every 5 minutes (see https://www.cisco.com/c/en/us/td/docs/cloud-systems-management/network-automation-and-management/dna-center-assurance/1-3/b_cisco_dna_assurance_1_3_ug/b_cisco_dna_assurance_1_3_ug_chapter_0101.html#concept_f5g_rpg_bfb).

An example is the following: 90% ("Network Health Score")=90 (number devices with health index between 8 and 10)/100 (total number of devices in the network).

A second example is a switch of the firm, Indu-Sol, by means of which a leakage current monitoring is enabled (see https://www.indu-sol.com/fileadmin/user_upload/propassageways/profinet/infrastrukturkomponenten/Switche/Indu-Sol_PROFINET_Switch_PROmeshP9.pdf for other information).

As a rule, in the case of such solutions, the network as a whole or infrastructure components (e.g. switches) are considered. From a field device, however, no solutions are known, which summarize its connection quality in simple manner.

SUMMARY

An object of the invention is to provide a field device, which can automatically provide information concerning the quality of its connection with a communication network.

The object is achieved by a field device of automation technology having a function for checking quality of a network connection, wherein the field device includes an operating electronics and at least one communication interface for connecting to a communication network having one or more network participants and for building a communication connection, wherein a communication stack and a PHY are associated with the communication interface, wherein the communication stack and the PHY are embodied, continually, to gain and to store communication information regarding the communication connection, wherein the operating electronics is embodied to read out communication information from the communication stack and from the PHY, and by means of an algorithm to subject the communication information to computation and based on the result of the computation to classify a communication state.

The field device of the invention enables, in simple manner, gaining information concerning quality of connection with the communication network, in which the field device is connected. For this, the field device reads-out communication information, which—depending on network type or protocol—are registered and stored according to standard. For interpretation of such communication information and, especially, for gaining additional information therefrom, serious, protocol specific knowledge can be required. The field device of the invention subjects this communication information automatically to computation. The result, expressed a communication state, is easy to understand for service personnel and plant operators, such that no protocol specific knowledge is required.

The terminology, communication stack, in connection with the field device of the invention refers to a conceptual architecture of communication protocols. Graphically, the individual protocols, in such case, are arranged as consecutively numbered layers one on top of one another in a stack. Each layer uses, in such case, the next lower layer in the protocol stack for fulfilling its particular task. In this communication stack, the information is captured protocol dependently, automatically during operation, and stored in a data memory associated with the communication stack.

PHY is a term from computer- and communications engineering referring to a special integrated circuit or functional group of a circuit responsible for encoding and decoding data between a purely digital system and a modulated analog system. PHY stands, in such case, for "physical interface". The term is found, for example, on the circuit diagrams of Ethernet cards. Fully integrated Ethernet controller chips have a so-called "PHYceiver" incorporated in them.

The network participants are, for example, other field devices, however, also control units (for example, PLCs), infrastructure components (switches, gateways) or industrial PCs.

Examples of types of field devices have already been given in the introductory part of the description.

In an advantageous embodiment of the field device of the invention, such is embodied to provide the communication state per communication interface to one or more of the network participants. The field device can transmit the communication state (depending on type/protocol of the communication network), in such case, automatically (with targeting) to at least one of the communication participants or by broadcast), or upon query from one of the network participants. It can also be provided that the field device has, in such case, another communication interface and utilizes this to transmit the communication state via another communication network, for example, via a radio network (Bluetooth, WiFi, etc.).

In an advantageous embodiment of the field device of the invention, such includes a display unit, wherein the field device is embodied to output the communication state via the display unit—alternatively or supplementally to the above described embodiment. The display unit is, for example, a display. The term display unit can, however, be broadly construed. Thus, the display unit can also be a web server for output of the communication state or a communication interface for retrieving the communication state by service devices.

In an advantageous embodiment of the field device of the invention, it is provided that the communication network is an Ethernet based network, especially Modbus TCP, PROFINET, EtherNet/IP or OPC UA. Of course, also other network types/protocols can be applied, which provide the registering and generating of communication information according to standard.

In an advantageous embodiment of the field device of the invention, it is provided that the communication information comprises the following:
 status concerning whether a communication connection via the at least one communication interface has been established or not, or, if yes, whether it has been established via a plurality of communication interfaces;
 number of bytes received from the communication interface;
 number of byte reception errors;
 number of bytes transmitted or emitted from the communication interface;
 number of byte transmission errors;
 number of active TCP connections;
 number of TCP frames received;
 number of TCP frame reception errors;
 number of TCP packets transmitted;
 number of TCP frame transmission errors;
 number of UDP ports available;
 number of UDP packets received;
 number of reception errors of UDP packets;
 number of UDP packets transmitted;
 number of transmission errors of UDP packets;
 application relation (AR) status;
 information regarding approximate network load of the incoming data, or packets;
 information regarding approximate network load of the outgoing data, or packets
 information regarding a signal level; and/or
 information regarding a signal-to-noise ratio.

This communication information can be divided into protocol specific communication information and port diagnostics information. Protocol specific communication information (for example, TCP- or UDP information; network load in the case of PROFINET) is not present for all protocol types, but, rather, only for certain protocols. Port diagnostics information is, as a rule, present for all protocol types and includes general information concerning sent/received bytes, signal level, signal-to-noise ratio and is obtained from the PHY, for example.

Communication information is present as numerical values and is, in given cases, normalized (for example, converted to percent values), in order that such can be subjected to computation in simple manner by the algorithm.

In an advantageous embodiment of the field device of the invention, it is provided that the result of the computation is a numerical value, and the operating electronics is embodied to classify the communication state based on at least two cut-off values into one of at least three states.

For example, the result is a percentage, which can lie between 0% and 100%, wherein 0% is the worst value and 100% is the best possible value. The three states are, for example, "communication in order", "communication degraded" and "communication disturbed". The states can also be based on states of established standards, for example, the NAMUR recommendation. The cut-off values can be predetermined in the device as default values and/or be set by a user.

Computation of the communication state occurs via the algorithm. This applies a mathematical formula, in order to subject the individual pieces of communication information to computation. In the simplest case, the communication information is averaged. Since in given cases not all communication information has the same significance concerning the stability of the connection, preferably a weighted formula is used, in the case of which the individual pieces of communication information receive specific weightings. Additionally or alternatively, limit values for individual pieces of information can be established. If these, depending on type, are sub- or exceeded, then the worst possible status is selected, independently of the values of the other pieces of communication information.

Alternatively, it can be provided that the algorithm is based on an AI model, for example, a deep learning model or a neural network, which, for example, is trained by means of training data for the three states and sometimes can find small nuances in the communication information, in order to identify the correct state.

In a further development of the field device of the invention, the operating electronics is embodied to perform a reliability testing based on further information, wherein the reliability testing provides information concerning the extent to which the classified communication state is trustworthy information. For example, considered as other information is the number of received/transmitted packets. To the extent these numbers are small after short operating time, the meaning of the communication state is small.

For example, also external maintenance procedures can be registered, in which the network behaves differently, but the communication nevertheless functions correctly, even when values of certain pieces of information have changed. The result of the reliability testing can, for example, be embodied in binary manner, such that the states are "OK" and "not reliable". It can be provided that when the state turns out to be "not reliable", the value leading to this result is "frozen" and the communication state assumes the last "reliable" state, until the new computed states are reliable again.

BRIEF DESCRIPTION OF THE DRAWINGS

The invention will now be explained in greater detail based on the appended drawing. The sole FIGURE of the drawing shows as follows FIG. 1 shows an example of an embodiment of the field device of the present disclosure, which is integrated into a communication network.

DETAILED DESCRIPTION

FIG. 1 shows a field device FD. Such serves, for example, for registering a flow velocity of a fluid medium in a pipeline. Field device FD can, however, be any other desired type of field device, such as indicated by way of example in the introductory part of the description.

Field device FD is connected into a communication network via two connection lines L1, L2. Connection lines L1, L2 form, in such case, a ring topology. The later computed communication state KS enables, for example, determining whether the ring topology is broken or the network system is functioning correctly.

For connecting the field device FD into the network, just one of the two connection lines L1, L2 is sufficient. It can, consequently, alternatively be provided that the field device is connected by only one of the two connection lines L1, L2. In the present example, the field device uses the protocol PROFINET. The connection lines L1, L2 are connected with the communication interface of the field device FD. Depending on network type, the field device FD is supplied with the electrical energy required for its operation via the connection lines L1, L2, or via a separate means of power supply PS.

Other network participants besides the field device are connected to a superordinated unit SU, in this case, a PLC, which queries measured values of the field device FD, as well as to a switch SW, which as infrastructure component connects other, not shown segments of the communication network.

During operation, the communication interface of the field device FD continually gains communication information, which permits an evaluation of the connecting performance of the field device FD in the communication network. For this, there is associated with the communication interface a communication stack and a PHY, which perform these tasks. In regular intervals, or upon initiative of a user, or upon query by one of the network participants NP, the operating electronics of the field device FD accesses the communication stack and the PHY, in order to read out communication information stored there. Associated with the operating electronics is an algorithm, which subjects the read-out communication information to computation and calculates a communication state KS.

The computation of the communication state KS occurs via the algorithm. The algorithm applies a mathematical formula, in order to subject the individual pieces of communication information to computation. For this, there are various options:

1). The average value over all communication information is formed. In such case, all pieces of communication information have the same weighting factor.

2.) A weighted formula is used, in the case of which the individual pieces of communication information receive individualized weighting factors. For example, UDP-specific pieces of communication information receive high weighting factors, since these concern cyclic telegrams and, consequently, are important, in order to assure a correctly functioning operation.

Additionally or alternatively to 1.) or 2.), limit values for individual pieces of communication information can be established. If these are, depending on type, sub- or exceeded, then the worst possible status is selected, independently of the values of the other pieces of communication information. An example concerns the communication information "status, whether a communication connection has been established via the communication interface or not". If is no communication connection has been established, then the worst possible status is selected by way of default.

3.) The algorithm is based on an AI model, for example, a deep learning model or a neural network, which has been trained earlier by means of training data to the three states S1, S2, S3 and can sometimes notice small nuances in the communication information, in order to identify the correct state S1, S2, S3. The algorithm can, in such case, have a feedback-function: If, for example, the worst possible state S3 is calculated, yet the connection is functioning without problem, then such can be told to the algorithm by feedback. The algorithm learns from these experiences and improves over the operating time.

The calculated communication state KS exists as a numerical value. Depending on the size of the communication state KS, such is classified as one of three states S1, S2, S3. The cut-off values marking the beginning and ending of states are stored as default values in the field device FD. They can, however, be changed by a user. State S1 is the best possible case and means "communication in order—good". State S2 means "communication degraded—maintenance required". State S3 is the worst possible state and means "communication disturbed—maintenance absolutely necessary".

The communication state KS, i.e. the particular state S1, S2, S3, can be read via the display unit DU of the field device FD. For example, a special menu is presented, via which the current communication state can be learned. It can also be provided to make the communication state KS available to the network participants SU, SW via communication interface, or to additional devices, for example, service devices, which utilize the "SmartBlue" app developed by the applicant, via a further communication interface, for example, a radio interface.

The invention claimed is:

1. A field device of automation technology having a function for checking a quality of a network connection, the field device comprising:
   an operating electronics; and
   a communication interface for connecting to a communication network having one or more network participants and for building a communication connection,
   wherein a communication stack and a PHY are associated with the communication interface and the communication stack and the PHY are embodied continually to gain and to store communication information regarding the communication connection,
   wherein the operating electronics is embodied to:
      read out communication information provided as numerical values from the communication stack and from the PHY;
      compute a communication state via an algorithm and using the communication information, wherein the computed communication state is a numeric value; and
      classify the communication state into one of three statuses based on two cut-off values, wherein each of the three statuses indicates the quality of the network connection,
   wherein the communication information includes: port diagnostic information; the port diagnostic information including general information about transmitted and received bytes; regarding a signal level and regarding a signal-to-noise ratio.

2. The field device as claimed in claim 1, wherein the field device is embodied to provide the computed and classified communication state by communication interface to one or more of the network participants.

3. The field device as claimed in claim 1, further comprising:
   a display unit,
   wherein the field device is embodied to output the computed and classified communication state via the display unit.

4. The field device as claimed in claim 1, wherein the communication network is an Ethernet based network, including ModBus TCP, PROFINET or EtherNet/IP.

5. The field device as claimed in claim 4, wherein the communication information includes the following:
   status concerning whether a communication connection via the communication interface has been established or not;
   status concerning whether a ring connection has been established;
   number of bytes received from the communication interface;
   number of byte reception errors;
   number of bytes transmitted or emitted from the communication interface;
   number of byte transmission errors;
   number of active TCP connections;
   number of TCP frames received;
   number of TCP frame reception errors;
   number of TCP packets transmitted;
   number of TCP frame transmission errors;
   number of UDP ports available;
   number of UDP packets received;
   number of reception errors of UDP packets;
   number of UDP packets transmitted;
   number of transmission errors of UDP packets;
   application relation status;
   information regarding approximate network load of incoming data, or packets;
   information regarding approximate network load of outgoing data, or packets;
   information regarding a signal level; and/or
   information regarding a signal-to-noise ratio.

6. The field device as claimed in claim 1, wherein the operating electronics is further embodied to perform a reliability testing based on further information, wherein the reliability testing provides information concerning extent to which the classified communication state is trustworthy information.

7. The field device as claimed in claim 1,
   wherein the operating electronics is further embodied to:
      set a limit value corresponding to each communication information, and
      classify the communication state as a worst possible status when the communication information exceeds its respective limit.

* * * * *